United States Patent [19]

Napoli et al.

[11] Patent Number: 5,106,203

[45] Date of Patent: Apr. 21, 1992

[54] EXHAUST GAS TEMPERATURE SENSOR

[75] Inventors: Phillip D. Napoli, West Chester; Francis P. Laska, Cincinnati, both of Ohio

[73] Assignee: General Electric Company, Cincinnati, Ohio

[21] Appl. No.: 562,358

[22] Filed: Aug. 3, 1990

[51] Int. Cl.⁵ .................. G01K 13/00; G01K 7/02
[52] U.S. Cl. ...................... 374/144; 374/179
[58] Field of Search ............. 374/110, 112, 113, 144, 374/166, 179, 115, 137; 73/117.3, 341

[56]     References Cited
       U.S. PATENT DOCUMENTS

| | | | |
|---|---|---|---|
| 1,659,804 | 2/1928 | Brown | 374/115 |
| 2,698,872 | 1/1955 | Broffitt | 374/115 X |
| 2,830,286 | 4/1958 | Brunges, Jr. | 340/233 |
| 2,875,613 | 3/1959 | Neal | 73/341 |
| 2,996,916 | 8/1961 | Smith | 73/341 |
| 3,022,668 | 2/1962 | Lawson et al. | 73/342 |
| 3,053,922 | 9/1962 | Schunke | 136/4 |
| 3,101,617 | 8/1963 | Brinson | 73/341 |
| 3,348,414 | 10/1967 | Waters et al. | 73/341 |
| 3,509,768 | 5/1970 | Reynolds et al. | 73/341 |
| 3,596,518 | 8/1971 | Kirkpatrick | 73/341 |
| 3,618,386 | 11/1971 | Black | 73/340 |
| 3,620,081 | 11/1971 | Black | 73/340 |
| 3,623,367 | 11/1971 | Benedict | 374/115 X |
| 3,719,071 | 3/1973 | Hohenberg | 73/341 |
| 3,990,308 | 11/1976 | McCormick et al. | 73/340 |
| 4,131,756 | 12/1978 | Smith | 136/230 |
| 4,186,605 | 2/1980 | Bourigault | 73/341 |
| 4,480,930 | 11/1984 | DeZubay et al. | 374/134 |
| 4,580,910 | 4/1986 | Corwin | 374/144 |
| 4,583,867 | 4/1986 | Gautheret | 374/113 |
| 4,595,298 | 6/1976 | Frederick | 374/144 |
| 4,733,975 | 3/1988 | Komanetsky et al. | 374/144 |
| 4,951,498 | 8/1990 | Kiuchi | 73/117.3 |

Primary Examiner—William A. Cuchlinski, Jr.
Assistant Examiner—W. Morris Worth
Attorney, Agent, or Firm—Bernard E. Shay; Jerome C. Squillaro

[57]  ABSTRACT

An exhaust gas temperature sensor is described which includes first, second and third thermocouples connected in parallel to measure the gas temperature at the first, second and third penetration depths in an exhaust passage. In a preferred embodiment of the present invention, an exhaust temperature sensor mounted in a turbine passage including an inner and outer wall includes a first thermocouple located between approximately 26 percent and 30 percent of the distance from the outer wall to the inner wall. A second thermocouple is located between approximately 58 percent and 62 percent of the distance between the outer and inner passage walls. A third thermocouple is located between approximately 68 percent and 72 percent of the distance between the inner and outer passage walls.

8 Claims, 8 Drawing Sheets

EXHAUST GAS TEMPERATURE SENSOR

The present invention relates in general to temperature sensors for use in measuring the exhaust gas temperature in a gas turbine engine, and, more particularly, to a three thermocouple element exhaust gas temperature sensor for use in gas turbine engines.

Exhaust gas temperature (EGT) may be used to measure the performance of a gas turbine engine. The exhaust gas temperature also provides an indication of the rate of deterioration of gas turbine engine components. Thus, since the exhaust gas temperature is an indicator of engine status, it may be used to measure and control operational and functional characteristics of the engine.

Accurate measurement of the exhaust gas temperature level is important. To accurately measure exhaust gas temperatures, it is necessary to minimize degradation of the EGT measurement system. Thus it is desirable that the EGT measurement system compensate for engine to engine variations and combustor exit temperature profiles. In addition, the measurement system should compensate for shifts in engine profiles that may occur with progressive deterioration of the engine components.

One of the most common temperature sensors includes two thermocouple elements. The two thermocouples are connected in parallel. Five thermocouple sensors are also known. Five thermocouple elements may be used, for example, to characterize an engine but are too long to be used in normal operation. The thermocouples in these sensors are normally located at depths of 13, 28.3, 48.3. 69.3 and 91.6 percent of the exhaust passage.

Thermocouples may be constructed by soldering or welding a chromel alloy wire to an alumel alloy wire. Other known thermocouples comprise, for example, a Copper alloy, Chrome alloy or Iron alloy soldered or welded to a constantan alloy. Additionally, thermocouples could be constructed by soldering or welding a Platinum alloy to a Rodium alloy. The wires are generally equal in length to match impedances. The composition of the wire depends on the characteristics and temperature range of interest.

These dual element sensors are normally used to measure the temperature of gases exhausted by the measure the temperature of these exhaust gases, the sensors may be disposed in predetermined positions around the engine and inserted to a predetermined depth into, for example, the passage between the combustor and the turbine. This passage is formed by an inner wall which surrounds the rotor shaft and an outer wall which is part of the engine casing. The exhaust passage is designed to channel high temperature exhaust gases from the combustor to the turbine. Alternatively, the sensors may be arranged in either the high pressure turbine or the low pressure turbine, depending on, for example, the engine characteristics.

The penetration of a particular sensor is determined by the temperature profile of the exhaust gases. The exhaust gas temperature profile is determined by the number, type and arrangement of the combustion nozzles in the combustor. The exhaust gas temperature profile for a particular engine may be determined by using a large number of thermocouple elements (e.g., forty) arranged in a number of sensors around the exhaust passage and at various penetration depths. Once the exhaust gas temperature profile is defined for a particular type of engine, it may be used to calculate the number and arrangement of EGT sensors necessary to monitor the exhaust gas temperature during normal engine operation.

In one arrangement for monitoring exhaust gas temperature during normal operations, eight sensors are used in a redundant scheme. In this monitor, four sensors are connected to a first wire harness which, in turn, is connected to a first set of output logic. The output logic interprets the signals from the sensors, and provides an output signal To provide redundancy, a second set of four sensors are connected through a second wire harness to a second set of output logic which provides a second output signal. The sensors may comprise a pair of thermocouples of alumel wires soldered to chromel-alumel wires. Sensors using two thermocouples may be referred to as dual thermocouple sensors. In these monitors, the alumel leads for each sensor may be combined into a single lead for each harness. The four chromel-alumel leads and the single alumel lead for each harness is connected to the output logic via five pin socket connector.

In order to accurately measure the exhaust gas temperature, each sensor is inserted into the exhaust passage to a predetermined insertion depth. The depth of insertion of the sensor is normally stated as percentage of the distance from the outer to the inner wall of the passage. Thus, a particular thermocouple element may be said to have been inserted to approximately 28 percent of the passage height, meaning that the thermocouple is located at a distance from the outer wall which is approximately twenty-eight percent (28%) of the total distance between the outer and inner passage walls.

The exhaust gas temperature profile is normally selected to reduce the temperature of the turbine blades at the points of greatest stress. Thus, the gas in the turbine passage normally has a non-symmetrical temperature profile. In particular, the combustors may be arranged such that the highest temperature gas passes close to the outer wall of the exhaust passage. Since the exhaust gas temperature is highest near the outer wall, the exhaust gas temperature distribution is described as having an "outboard peaked" temperature profile. This temperature profile reduces the temperature on the turbine blade near the attachment point. The region near the attachment point normally experiences the greatest mechanical stress.

In the monitor described previously, the exhaust gas temperature was measured using a two thermocouple sensor. The first thermocouple being located at approximately 28.3 percent of the passage height and the second thermocouple being located at approximately 59.7 percent of the passage height. The system utilized eight separate sensors in two groups of four around the engine. In that arrangement, the sensor leads may be arranged into an upper and lower harness for easy installation, maintenance redundancy and reduced weight. Individual sensors may be located circumferentially at 19., 74., 157., 185 , 213., 263., 296. and 352 from the top of the turbine.

In dual combustor engines, the combustion chamber includes several dual dome combustors arranged around the combustion chamber. The two domes (or nozzles) in each of the combustors are each designed to perform a particular function. For example, the outer or pilot dome may be used during starting or idle conditions while the inner or main dome is used when greater thrust is required. The temperature profile of the exhaust changes as one or the other of the domes are switched on or off. Thus, accurate exhaust gas temperature (EGT) measurement over the entire steady state and transient thrust spectrum of a gas turbine engine utilizing a dual annular combustor is extremely difficult. Current EGT measurement systems have difficulty dealing with the wide variation of combustor exhaust gas temperature profiles in dual combustor engines.

SUMMARY OF THE INVENTION

In the present invention, an exhaust gas temperature sensor includes first, second and third thermocouples connected in parallel to measure the gas temperature at a first, second and third penetration depths within the exhaust passage.

In a preferred embodiment of the present invention, an exhaust temperature sensor mounted in a turbine passage including an inner and outer wall includes a first thermocouple located between approximately 26 percent and 30 percent of the distance from the outer wall to the inner wall. A second thermocouple is located between approximately 58 percent and 62 percent of the distance between the outer and inner passage walls. A third thermocouple is located between approximately 68 percent and 72 percent of the distance between the outer and inner passage walls. More particularly, the first thermocouple may be located approximately 28.3 percent the distance between the outer and inner passage walls. A second thermocouple is located approximately 59.7 percent of the distance between the outer and inner passage walls and a third thermocouple is located at approximately 70 percent of the distance between the outer and inner passage walls.

In a further embodiment of the present invention, an exhaust gas temperature sensor is mounted in an exhaust passage including inner and outer walls. The exhaust gas in the passage has an outboard peaked temperature profile and the first thermocouple is located at a position within the passage wherein the exhaust gas temperature exceeds the average exhaust gas temperature. The second thermocouple is located at a position within the passage wherein the exhaust gas temperature exceeds the average exhaust gas temperature and the third thermocouple is located at a position within the passage wherein the exhaust gas temperature is less than the average exhaust gas temperature.

In a further embodiment of the present invention, the third thermocouple may be independently addressable.

In a further embodiment of the present invention, the third thermocouple may be located between the first and second thermocouple at approximately 40 percent of the distance between the outer and inner wall.

Temperature sensors according to the present invention substantially improve the measurement accuracy without significantly increasing the number of thermocouples.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION

Figure 1:
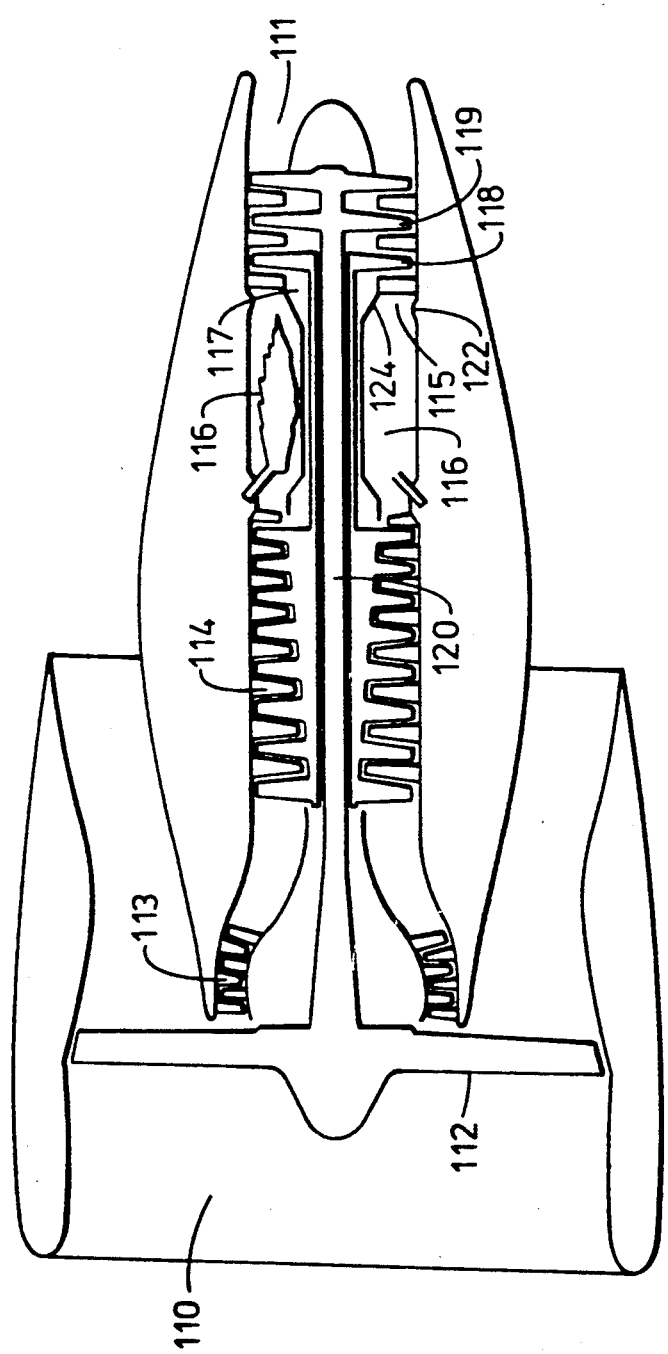
FIG. 1 is a cross sectional schematic diagram of a gas turbine engine of the type used for powering aircraft.

FIG. 1 illustrates the mechanical arrangement of a twin-spool gas turbine engine as shown in cross section along the engine axis. Air enters the engine through an inlet 110, located at the left of FIG. 1, then passes through a fan 112. A portion of the air passing through fan 112 is directed into a booster compressor 113 and thereafter into a high pressure compressor 114 which functions to supply supercharged air to combustion section 116. In the combustion section, fuel is mixed with the supercharged air received from compressor 114 and burned. The expanding gases pass through exhaust passage 115 and into high pressure turbine 118. Exhaust passage 115 includes inner wall 124 and outer wall 122. High pressure turbine 118 is coupled to compressor 14 through a shaft or spool 117. The high pressure turbine uses some of the energy in the rapidly moving, hot gases coming out of combustion chamber 116 to turn spool 117 to drive compressor 114. A low pressure turbine 119, positioned behind high pressure turbine 118, extracts additional energy from the exhaust gas and turns a second shaft or spool 120, coaxial with spool 117, to drive fan 112 and booster compressor 113. The exhaust air exits the engine via exhaust nozzle 111.

Figure 2:
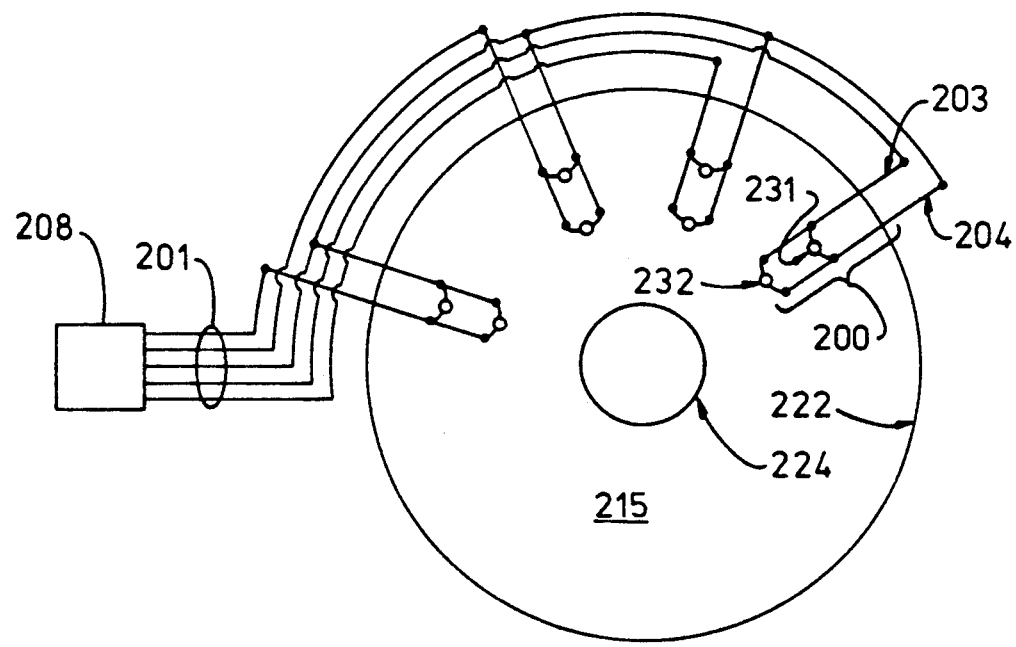
FIG. 2 illustrates an arrangement including a group of dual thermocouple sensors located at pre-determined positions around an exhaust passage.

FIG. 2 is a schematic diagram of a cross section of exhaust passage 115 taken along A-A in FIG. 1. In FIG. 2, eight sensors 200 (which may also be referred to as probes or rakes), each utilizing two thermocouples (which may also be referred to as elements) are connected via harness 201 to output logic 208. The sensors 200 each include thermocouple elements 231 and 232 sensors 200 are positioned through outer wall 222 of exhaust passage 215. Interior wall 224 of exhaust passage 215 is located a fixed distance from outer wall 222. Each sensor 200 may include an alumel wire 204. Alumel wire 204 forms a common lead with the other alumel wires in a set. Each sensor 200 further includes a chromel wire 203 connected to output logic 208.

Figure 3:
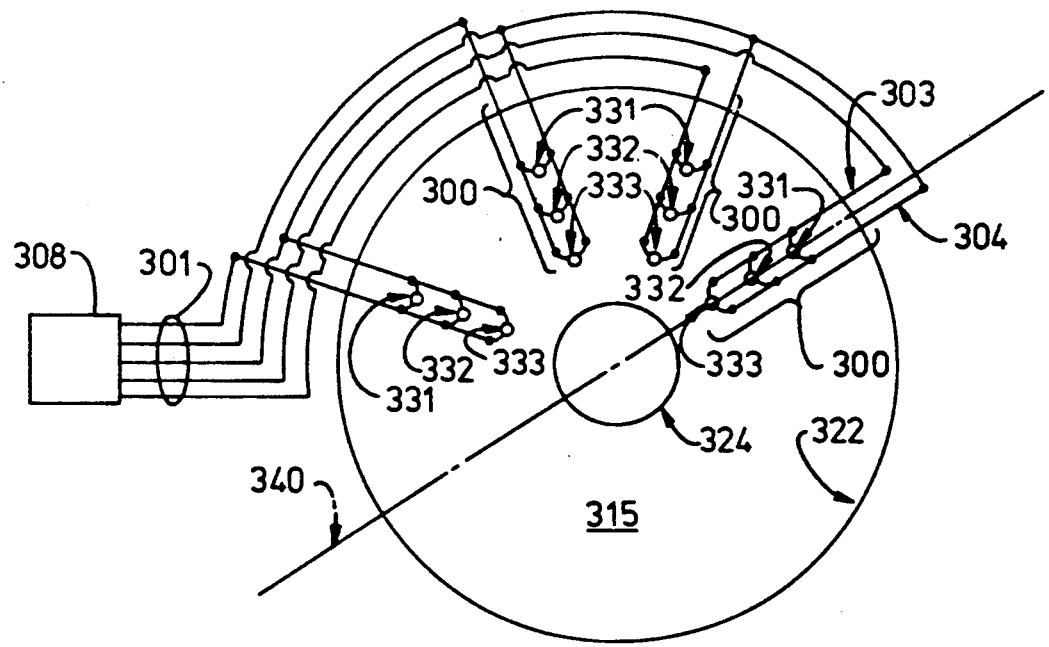
FIG. 3 illustrates an arrangement according to the present invention including a group of triple thermocouple sensors located at pre-determined positions around an exhaust passage.

In one embodiment of the present invention, illustrated in FIG. 3, an exhaust gas temperature sensor 300 is formed by aligning three thermocouples 331, 332 and 333 along a radial axes 340 of a gas turbine engine. In the arrangement of FIG. 3, first thermocouple 331 is connected in parallel with second thermocouple 332 and third thermocouple 333 through chromel wire 303 and alumel wire 304. Wires 303 and 304 are selected such that there is an impedance match between the individual thermocouple elements of each probe 300, insuring that the resistance of the individual wires are balanced and the voltage measured by logic 308 is proportional to the voltage at the thermocouple elements 331, 332 and 333. By connecting the thermocouple elements in parallel and matching the impedances between individual thermocouple elements, the voltage at the output of the sensor is proportional to the average of the voltage measured by the three thermocouples.

As illustrated in FIG. 3, a number of these exhaust gas temperature sensors may be mounted circumferentially around passage 315. It will be recognized that a second set of 4 sensors (not shown) could be arranged around the lower half of passage 315 and connected through a second cable to a second set of output logic to provide redundancy. Passage 315 is bounded by exterior wall 322 which may be, for example, a turbine housing wall, and interior wall 324 which may be for example, turbine mounting plates. In the embodiment of the present invention illustrated in FIG. 3, optimal measurements would be obtained where first thermocouple element 331 is located between approximately 26 and 30 percent of the distance between the outer wall 322 and inner wall 324 and, more particularly, at approximately 28.3 percent of the distance between outer passage wall 322 and inner passage wall 324. Further, second thermocouple element 332 could be located between approximately 58 and 62 percent of the distance between outer wall 322 and inner wall 324 and, more particularly at approximately 59.7 percent of the distance between outer passage wall 322 and inner passage wall 324. Finally, third thermocouple element 333 is located between approximately 68 and 72 percent of the distance between outer passage wall 322 and inner passage wall 324 and, more particularly, at approximately 70 percent of the distance between outer passage wall 322 and inner passage wall 324.

Figure 4:
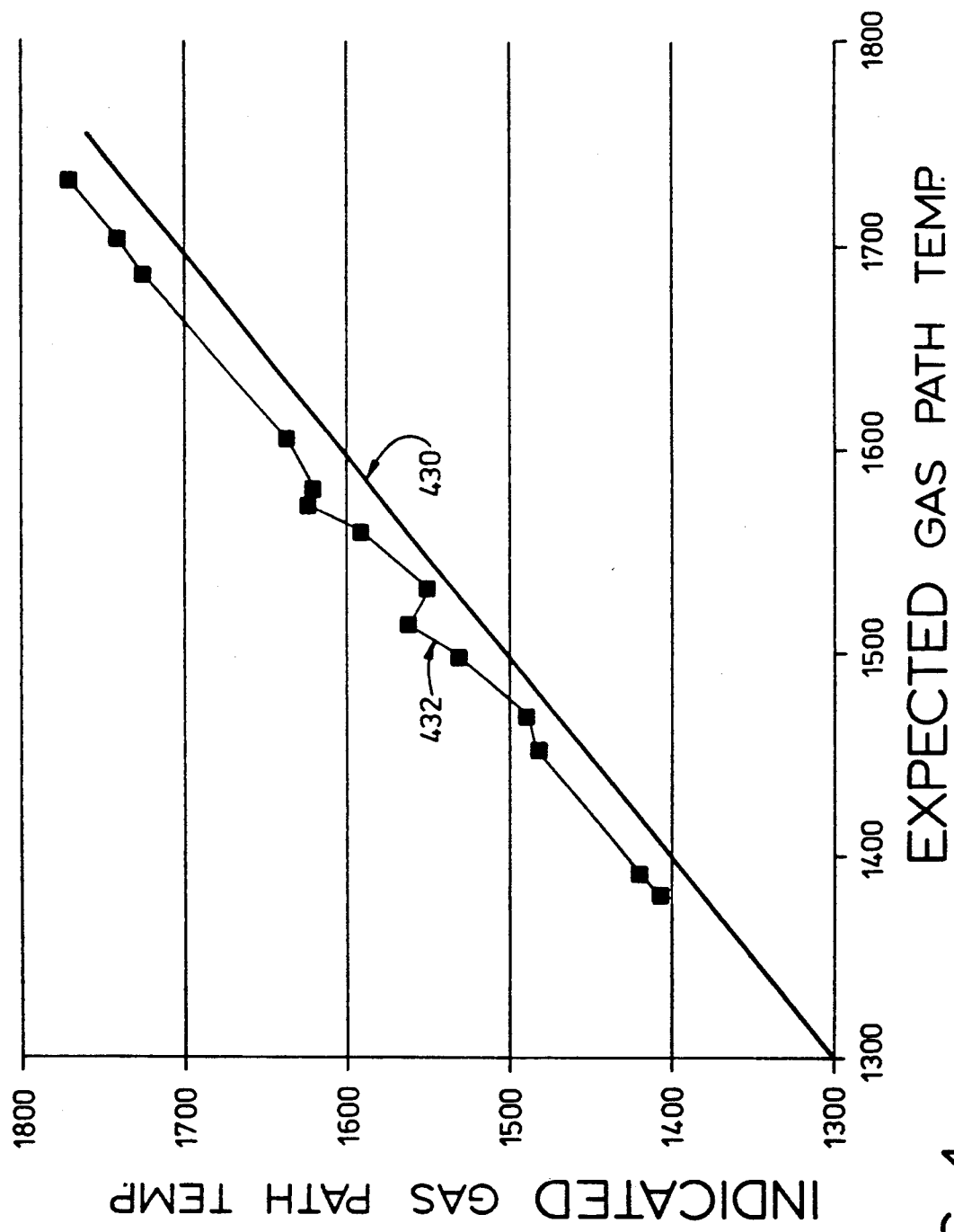
FIG. 4 is a plot comparing expected gas temperature to typical indicated gas temperatures for a dual thermocouple sensor.

The horizontal axis in FIG. 4 represents the expected (or true) gas path temperature for various power settings. The vertical axis in FIG. 4 represents the indicated temperature. Line 430 represents typical temperatures using eight sensors having five thermocouple elements per sensor. Using this arrangement, the temperature measured is almost identical to the expected or true temperature for any power setting. Line 432 connects a series of typical temperatures using eight sensors having two elements per sensor as illustrated in FIG. 2.

Figure 5:
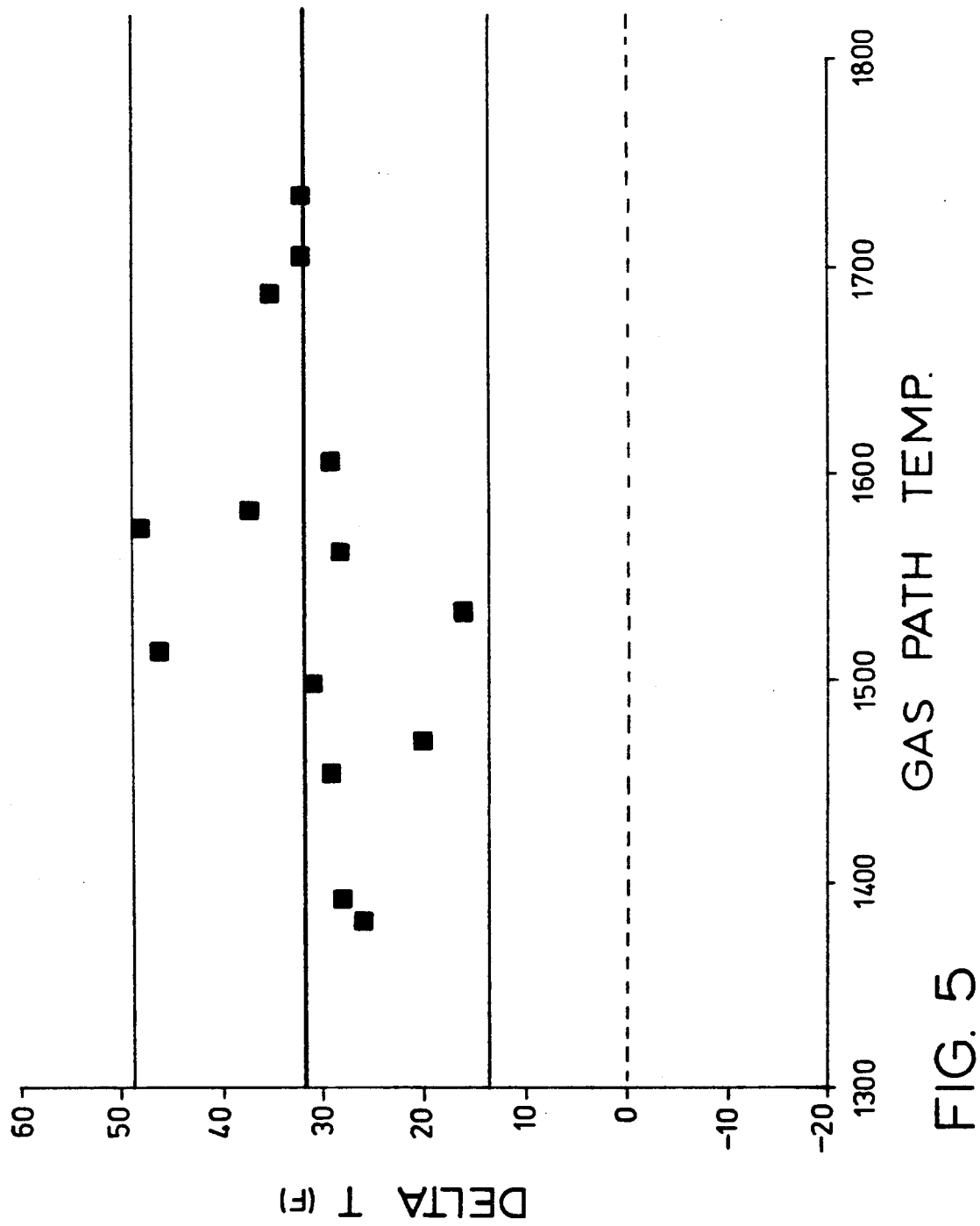
FIG. 5 is a plot of the typical indicated gas temperatures for a dual thermocouple sensor showing the mean gas temperature and the standard deviation for the plot in FIG. 4.

FIG. 5 illustrates the mean difference between the expected gas temperature and the temperature for a dual thermocouple sensor probe. In FIG. 5, the mean for a two element probe differs from the expected mean by approximately 32 degrees F. and the typical standard deviation from the mean for the dual thermocouple probe is approximately 17.2 degrees F. It is clear from FIGS. 4 and 5 that the dual element sensor does not accurately measure the expected gas path temperature.

Figure 6:
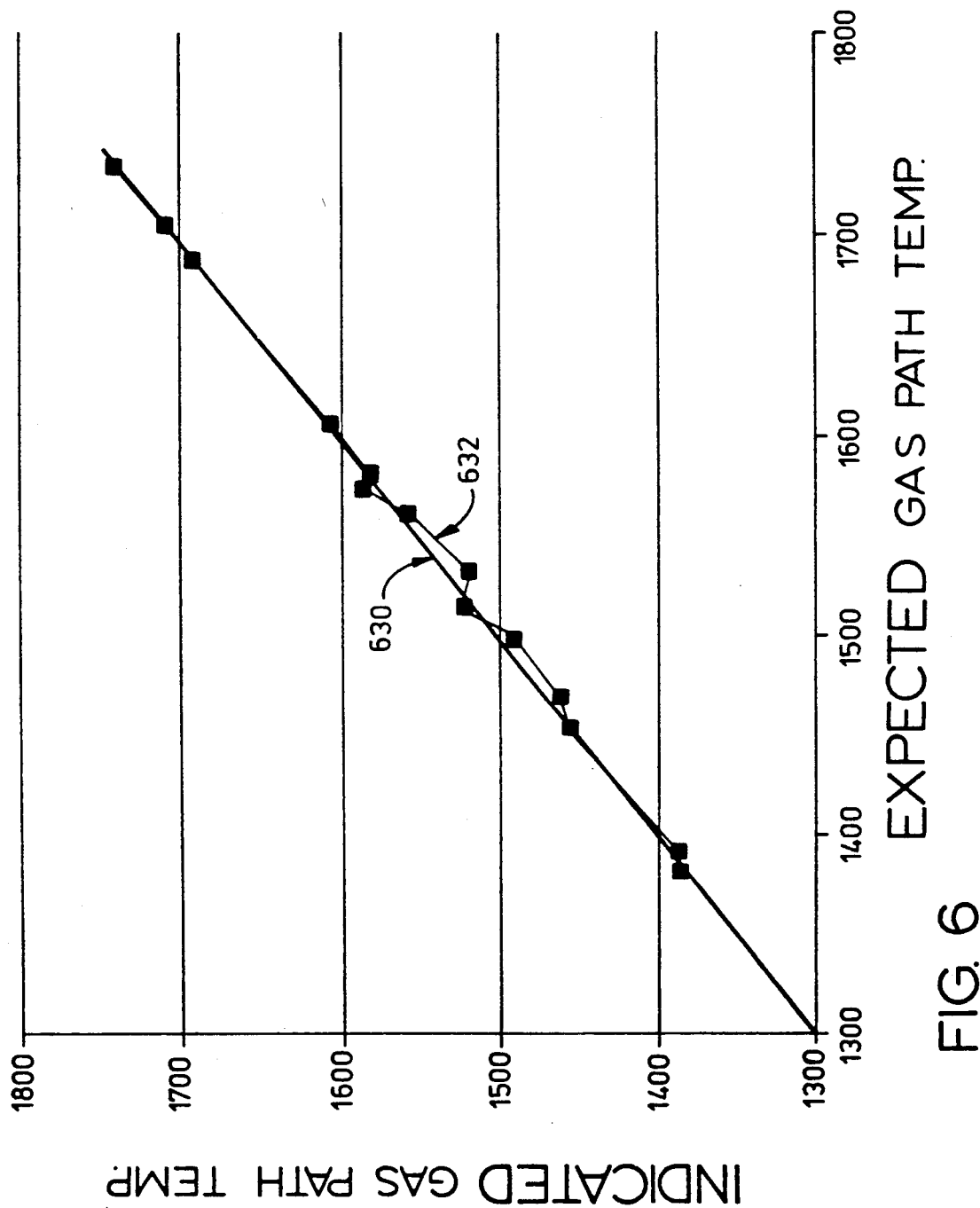
FIG. 6 is a plot comparing expected gas temperature to typical indicated gas temperatures for a triple thermocouple sensor according to the present invention.

FIG. 6 is a plot of typical temperatures for a triple element sensor according to the present invention. The axis in FIG. 6 are identical to those in FIG. 4.

In FIG. 6, line 630 represents the typical gas temperature using eight sensors having 5 thermocouples per rake. Line 632 connects a series of typical temperatures for eight sensors having 3 thermocouples wherein the insertion depths are approximately 28.3 percent, 59.7 percent and 70 percent of the distance from the outer to the inner passage wall in FIG. 3.

Figure 7:
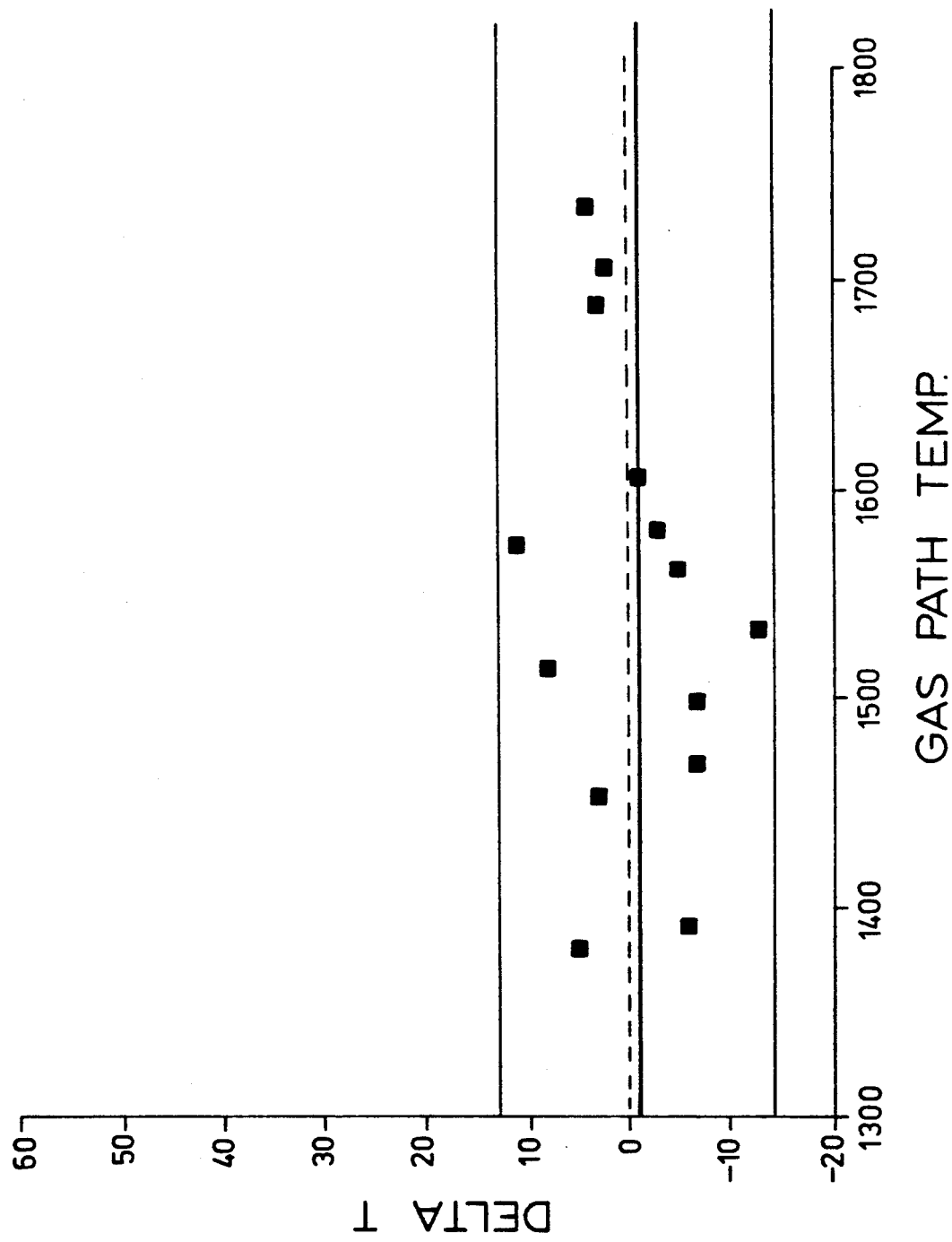
FIG. 7 is a plot of typical indicated gas temperatures for a triple thermocouple sensor showing the mean gas temperatures and standard deviation for the plot in FIG. 6.

FIG. 7 is a plot of the mean and standard deviation for the plot in FIG. 6. It will be recognized that the mean difference in FIG. 7 is reduced to approximately one degree F while the standard deviation is reduced to approximately 13.4 degrees F. Thus, using sensors according to the present invention, the mean difference is almost eliminated and the standard deviation substantially reduced. Standard deviation as illustrated in FIGS. 5 and 7 is defined as the temperature difference which would theoretically include 95.4 percent of the typical measurements (i.e., the two sigma points).

Figure 8:
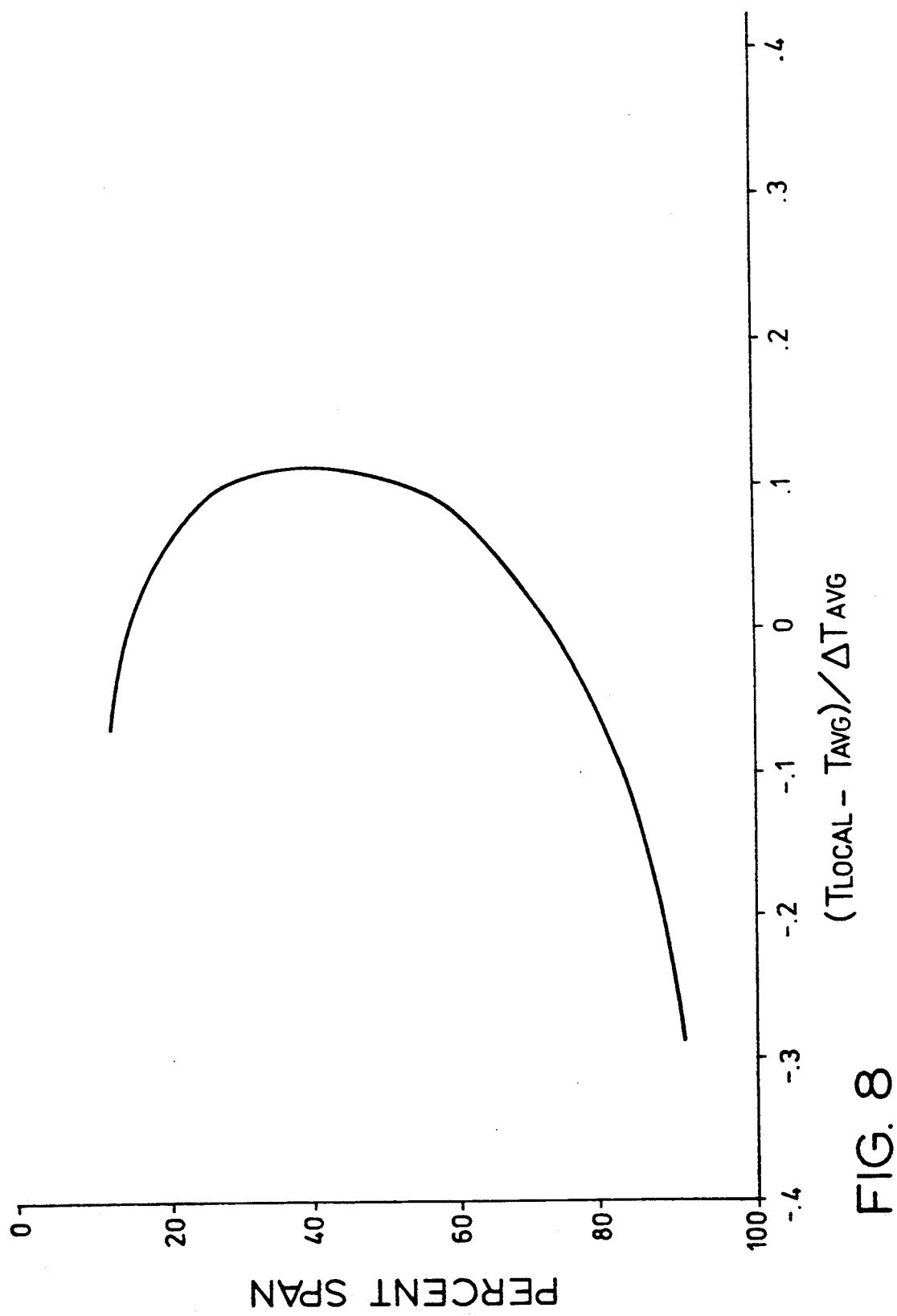
FIG. 8 is a plot showing a typical outboard peaked temperature profile.

In the arrangement of FIG. 3, the exhaust gas passing through the passage formed by inner wall 324 and outer wall 322, may have an outboard peaked temperature profile as illustrated in FIG. 8. The vertical axis in FIG. 8 represents the percent distance from the outer to the inner passage wall. The horizontal axis in FIG. 8 represents the normalized, circumferentially averaged temperature in the passage. The outboard peaked temperature profile illustrated in FIG. 8 is achieved when the maximum temperature in passage 315, as measured along radial axis 340, is higher in the region close to outer wall 322 than in the center of the passage or near inner wall 324. This outboard peaked temperature profile is normally used to reduce thermal stress on the sections of the turbine blade which are subjected to the greatest mechanical stress. Since the greatest mechanical stress is normally induced at a point close to interior wall 324, it is desirable to minimize the temperature (and thus the thermal stress) at that point. Therefore, the combustor is arranged such that the peak temperature occurs closer to outer passage wall 322 and the temperature profile is referred to as being "outboard peaked."

In order to accurately measure the temperature of the exhaust gas with an outboard peaked temperature profile, using a sensor according to the present invention as illustrated in FIG. 3, it is desirable to arrange the thermocouple elements such that first thermocouple 331 is located in a position where the exhaust gas temperature is normally above the average exhaust gas temperature as measured along radial axis 340. Further, second thermocouple 332 is located in a position where the exhaust gas temperature is normally above the average exhaust gas temperature measured along radial axis 340. Finally, third thermocouple 333 is located in a position where the exhaust gas temperature is normally below the average exhaust gas temperature as measured along radial axis 340.

Although the penetration depths described previously are calculated to optimize the temperature characteristics of the three element sensor, it is not always possible, in a hostile environment like a gas turbine engine, to place thermocouples at the optimal penetration depth. Therefore, taking into consideration the temperature and other effects, it has been determined that acceptable temperature measurements may be obtained by inserting the third thermocouple to a depth of approximately 40 percent of the total passage depth, thus placing the third thermocouple intermediate the first and second thermocouple. It is not expected that the placement of the third thermocouple at 40 percent of the passage depth will result in an improvement in measuring the actual gas path temperature. It is expected that the average gas path temperature measured by this probe will exceed the actual gas path temperature. It is expected that the average gas path temperature measured by this probe will exceed the actual gas path temperature by approximately 35 degrees Fahrenheit (degrees F.). It is expected, however, that the placement of the third thermocouple element at a depth of approximately 40 percent of the exhaust passage will improve the measurement deviation by approximately 4 degrees F. Therefore, in this embodiment of the present invention, the first thermocouple of the sensor is inserted to a depth of between approximately 26 and 30 percent of the distance from the outer to the inner wall. Further, a second thermocouple is located between approximately 38 and 42 percent of the distance between the outer and the inner wall. Finally, a third thermocouple is located between approximately 58 and 62 percent of the distance between the outer and inner wall. More particularly, the first thermocouple is located at approximately 28.3 percent of the distance between the outer and inner passage walls, the second thermocouple is located at approximately 40 percent of the distance between the outer and inner passage walls and the third thermocouple is located at approximately 59.7 percent of the distance between the outer and inner passage walls.

Figure 9:
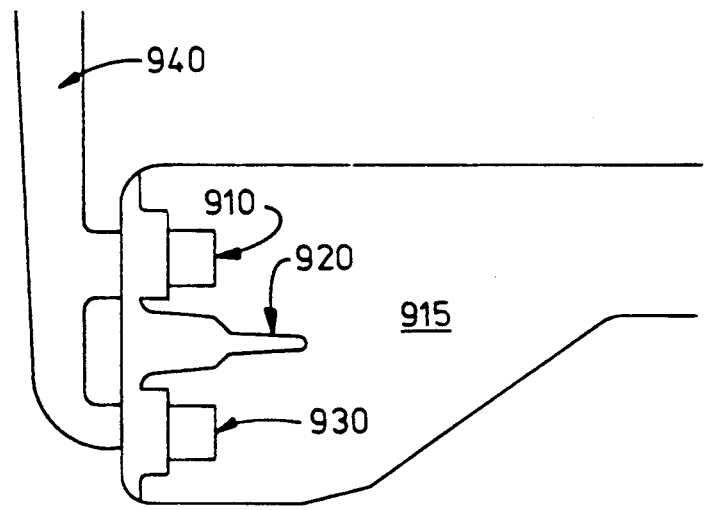
FIG. 9 is a schematic diagram illustrating a dual annular combustor.

A schematic of a dual annular combustor is presented in FIG. 9. This design differs from a single annular, fixed geometry combustor in that it features two separate fuel domes 910 and 930.

FIG. 9 illustrates a dual annular combustor arrangement including pilot stage dome 910, center body 920 and main stage dome 930. Fuel is fed to the pilot and main stages through fuel inlet 940. The fuel is burned in combustion chamber 915. During engine operation, pilot stage dome 910 is continuously fueled. Fueling of the main stage dome 930 is dependent on the overall fuel to air ratio as determined by the engine control logic. Exclusive operation of the pilot dome results in a comparatively high outboard peaked combustor exit temperature profile when compared to a single annular combustor. When the main dome is fired, the resulting combustor exit temperature profile varies over the corresponding thrust range because of the scheduled variation in dome fuel flow. It is this inherent variation in exit temperature profile produced by a dual annular combustor that compounds the difficulty in designing an EGT measurement system that is effective at all operational conditions.

In a further embodiment of the present invention designed to compensate for variations in the exhaust gas temperature profile resulting from the use of a dual annular combustor arrangement, the first and second thermocouples are connected in parallel, with the third being separately addressable. Thus the third thermocouple may be individually addressed to provide greater flexibility in measuring the temperature profile.

Figure 10:
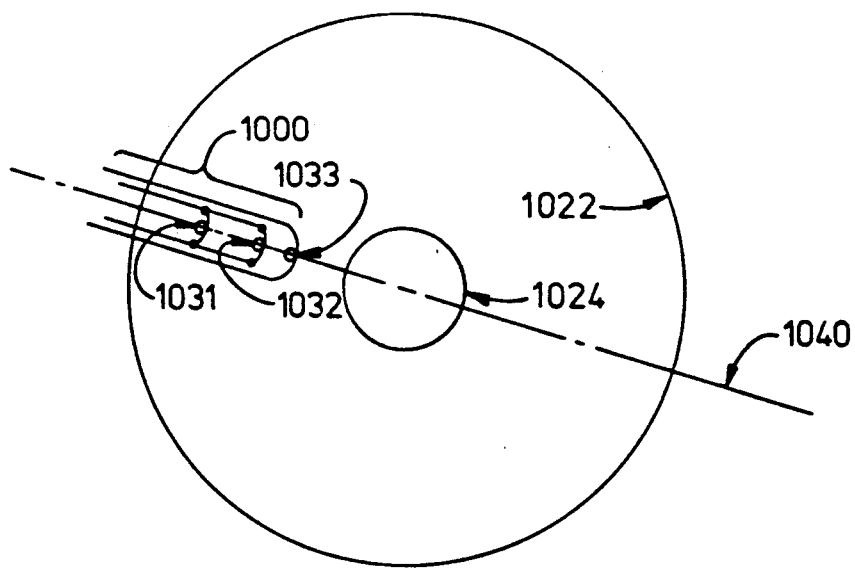
FIG. 10 is a schematic diagram of a three thermocouple sensor according to the present invention.

In FIG. 10, sensor 1000 includes first thermocouple 1031 which is connected in parallel with second thermocouple 1032. Sensor 1000 also includes thermocouple 1033 which is not connected electrically to either thermocouple 1031 or thermocouple 1032. Thus thermocouple 1033 is independently addressable, that is, the temperature at thermocouple 1033 may be read without reading the temperature at thermocouple 1031 and 1032. In FIG. 10, thermocouples 1031, 1032 and 1033 may be aligned along radial axis 1040.

In the embodiment of FIG. 10, temperature measurement may be optimized by placing thermocouple 1031 at between approximately 26 and 30 percent of the distance between outer passage wall 1022 and inner passage wall 1024. Further, thermocouple 1032 should be placed at between approximately 58 and 62 percent of the distance between outer passage wall 1022 and inner passage wall 1024. Finally, thermocouple 1033 should be placed between approximately 68 and 72 percent of the distance between the outer wall 1022 and inner wall 1024. More particularly, thermocouples 1031, 1032 and 1033 should be placed at 28.3 percent, 59.7 percent and 70 percent respectively of the distance between outer wall 1022 and inner wall 1024.

It will be recognized by those skilled in the art that sensors according to the present invention may be placed in either the high or low pressure turbines without substantially affecting their measurement capability. In a further embodiment of the present invention, the sensors may be positioned between the stage one low pressure spool and the first low pressure turbine blade. The exhaust from the combustor will maintain a stable temperature profile as it flows through the engine, therefore, the required sensor penetration, as a function of the channel width, will remain substantially constant as the sensors are moved along the engine axis.

It will further be recognized that, in the turbine area, the sensors would be positioned between turbine blades. Therefore, for the purpose of calculating the penetration depth, the outer wall would normally comprise the turbine housing while the inner wall would normally comprise the turbine flow path. The turbine flow path may comprise, for example, the turbine blade mounting platform. Thus, the inner and outer walls will always comprise the walls bounding the exhaust gas flow path at the point of sensor penetration.

While applicant has limited his discussion to thermocouples as temperature sensing means, it should be noted that applicant's invention encompasses the placement of any arrangement of temperature sensing means consistent with the claims. Thus, applicant does not intend to limit his invention to probes using "thermocouples" as known in the art, but to encompass any known or future device which senses temperature and is capable of an arrangement as defined in applicant's claims. As an example, a "thermocouple" according to applicants invention may include variable resistance type temperature sensors of, for example, platinum wire soldered or welded between two copper wires. Such variable resistance type sensors indicate temperature by changes in resistance.

It will also be recognized that references t alumel and chromel in the present invention include alumel alloys and chromel alloys respectively.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What we claim is:

1. An exhaust gas temperature sensor mounted in a passage including an inner passage wall and an outer passage wall said sensor substantially along a radial axis of said passage comprising:

a first thermocouple, wherein said first thermocouple is located between approximately 26 and 30 percent of the distance between said outer and inner passage walls;

a second thermocouple connected in parallel with said first thermocouple, wherein said second thermocouple is located between approximately 58 and 62 percent of the distance between said outer and inner passage walls; and a third thermocouple wherein said third thermocouple is located between approximately 68 and 72 percent of the distance between said outer and inner passage walls.

2. An exhaust gas temperature sensor according to claim 1 wherein:

said first thermocouple is located at approximately 28.3 percent of said distance;

said second thermocouple is located at approximately 59.7 percent of said distance;

said third thermocouple is located at approximately 70 percent of said distance.

3. An exhaust gas temperature sensor mounted in a turbine passage, including inner and outer walls, adapted to measure exhaust gas having an outboard peaked temperature profile, wherein:

a first thermocouple located at a position within said passage wherein the exhaust gas temperature exceeds the average exhaust gas temperature;

a second thermocouple is located at a position within said passage wherein the exhaust gas temperature exceeds the average exhaust gas temperature;

a third thermocouple is located at a position within said passage wherein the exhaust gas temperature does not exceed the average exhaust gas temperature; means for connecting said first and second thermocouples in parallel, wherein said thermocouples are aligned substantially along a radial axis of said passage.

4. An exhaust gas temperature sensor according to claim 3 wherein:

said first thermocouple is located between approximately 26 and 30 percent of the distance between said outer and inner passage walls;

said second thermocouple is located between approximately 38 and 42 percent of the distance between said outer and inner passage walls; and said third thermocouple is located between approximately 58 and 62 percent of the distance between said outer and inner passage walls.

5. An exhaust gas temperature sensor according to claim 4 wherein:

said first thermocouple is located at approximately 28.3 percent of said distance;

said second thermocouple is located at approximately 40 percent of said distance;

said third thermocouple is located at approximately 59.7 percent of said distance.

6. A probe adapted to measure the temperature of exhaust gas in a passage including inner and outer walls, wherein said probe comprises:

a first thermocouple located between approximately 26 and 30 percent of the distance between said inner and outer passage walls;

a second thermocouple located between approximately 38 and 42 percent of the distance between said passage walls;

a third thermocouple located between approximatley 58 and 62 percent of the distance between said passage walls;

said first and second thermocouples being connected in parallel; and said first, second and third thermocouples being aligned along a radial axis of said passage.

7. A probe according to claim 3 wherein:

said third thermocouple is connected in parallel with said first and second thermocouples.

8. A probe according to claim 6 wherein:

said first thermocouple is located at approximately 28.3 percent of the distance between said outer and inner passage walls;

said second thermocouple is located at approximately 40 percent of the distance between said outer and inner passage walls; and said third thermocouple is located at approximately 59.7 percent of the distance between said outer and inner passage walls.

* * * * *